United States Patent Office 2,855,247
Patented Oct. 7, 1958

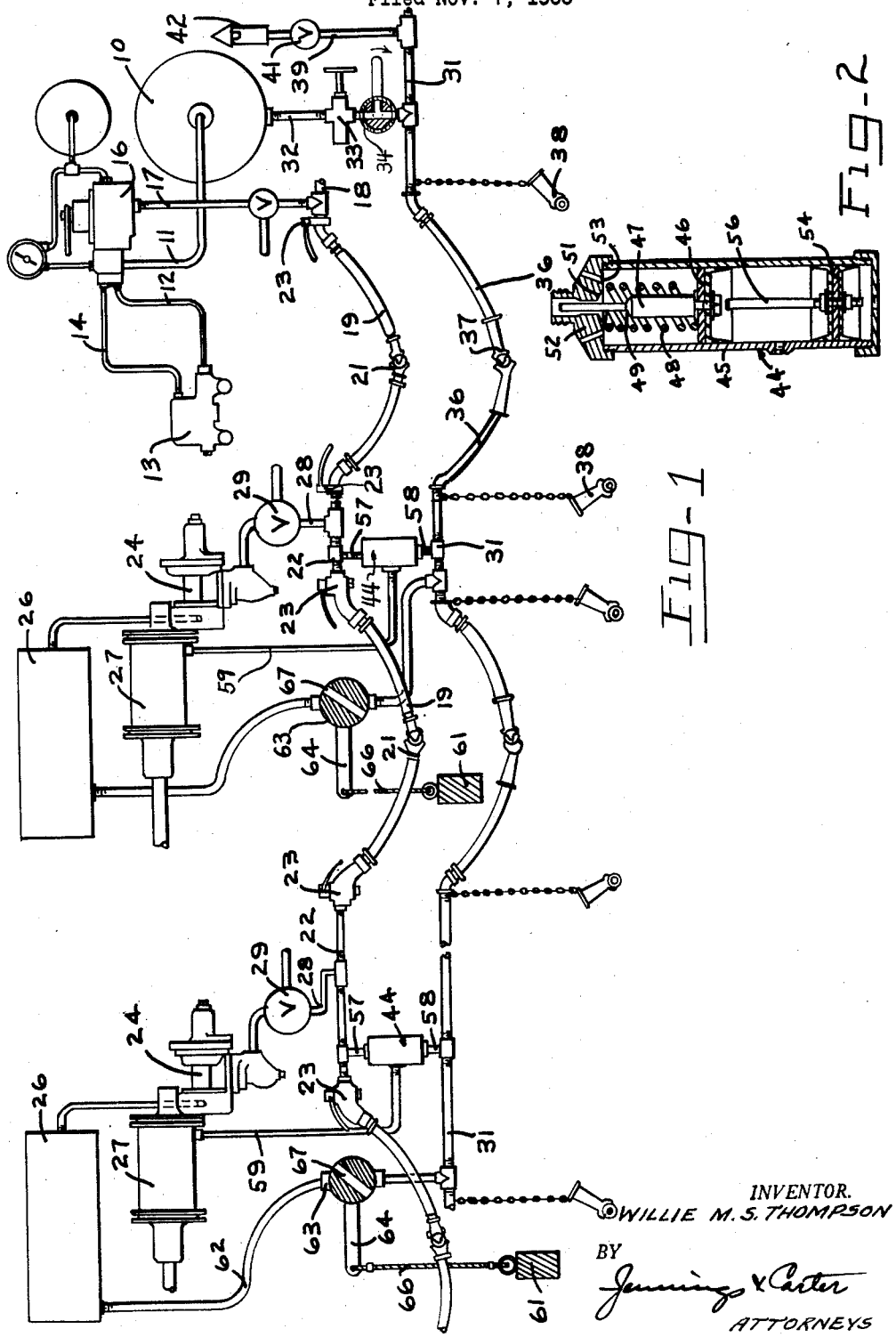

2,855,247

RAILWAY AIR BRAKE SYSTEM

Willie M. S. Thompson, Miami, Fla.

Application November 7, 1955, Serial No. 545,270

3 Claims. (Cl. 303—86)

This application is a continuation in part of my previously filed application Serial No. 500,965, filed April 12, 1955, now abandoned, and entitled "Emergency Application of Brakes on Railway Trains Which Also Signals the Dropping of a Brake Beam."

This invention relates to railway air brake systems in which the air pressure for operating the brakes on the several cars of a railway train is supplied from the locomotive through a brake pipe and which includes the usual auxiliary reservoir, triple valve, brake cylinders and brake rigging on each car of the train, and has for an object the provision of means to apply the brakes throughout a train in event the air supply be cut off from any portion of the train, preventing the normal application of the brakes on all cars from which the supply is cut off.

Another object of this invention is to provide, in a railway air brake system of the character designated, means to give an audible signal to the operating personnel of the train in event a brake beam should fall out of place in the train, and, at the same time, prevent the brakes from being applied on the car from which the brake beam has fallen.

Still another object of my invention is to provide a simple, inexpensive device which may be installed on railway cars and which shall be adapted to give the locomotive engineer an independent and positive means for making an application of the brakes on all cars in the train even when the supply of air to parts of the train is cut off by the closing of an angle cock between the cars.

Briefly, my invention comprises the provision of an additional pressure line, which will be referred to in this specification as a "signal line" and which is supplied with air under pressure lower than that usually prevailing in the brake pipe. Interposed between the brake pipe and this signal line is a normally closed double piston valve, operable to provide an opening to the atmosphere. The device comprises an elongated cylinder having two independently operable pistons mounted therein. A valve member is mounted on the outer end of the piston stem at one end of the cylinder and seats in a head of the cylinder. A second floating piston is mounted in the opposite end of the cylinder and has a stem extending inwardly into close proximity to the first mentioned piston. The space between the last mentioned floating piston and the adjacent head is connected to the air signal line and accordingly is supplied with air under pressure at the same pressure as exists in the signal line. The opposite end of the cylinder, in which the valve is mounted, is connected by a branch conduit to the brake pipe and when the valve member is off its seat, brake pipe pressure is vented to the atmosphere through ports provided in the adjacent head. The space between the two floating pistons is connected to the brake cylinder so that it is always supplied with whatever pressure is in the brake cylinder. Normally, the pressure in the end of the cylinder subjected to signal line pressure is sufficient to force the valve member onto its seat and thus prevent the escape of air from the brake pipe through the valve to the atmosphere.

Apparatus embodying features of my invention is illustrated in the accompanying drawings in which:

Fig. 1 is a diagrammatic view showing the application of my invention to the brake system of railway cars; and, Fig. 2 is a vertical sectional view of the signal operating valve.

Referring to the drawings for an understanding of my invention I show in Fig. 1 a typical air brake system for railway trains which, for the purpose of illustration is shown as comprising only two cars whereas it will be apparent that the invention is particularly adapted for a multiple car train. At 10 I show a main reservoir which is supplied with air under pressure from the usual air pump, not shown, at an elevated pressure say from 90 to 120 pounds per square inch. Air from the main reservoir passes through conduits 11 and 12 to a pressure reducing valve 13 and thence through conduit 14 to the engineer's brake valve 16, and thence to the brake pipe connection 17. As is well understood, the pressure reducing valve 13 reduces the pressure from the main reservoir down to that desired for operation of the brakes on the train, which is usually from 70 pounds to 110 pounds per square inch. The brake pipe connection 17 is connected to the brake pipe 18 and thence passes through the usual air hose 19, air hose coupling 21 to the brake pipe 22 on each of the cars of the train. At each end of each car and also the locomotive is an angle cock 23 whereby the flow of air rearwardly of the angle cock may be cut off. On each of the cars of the train is the usual triple valve 24, auxiliary reservoir 26, and brake cylinder 27. Air is supplied to the auxiliary reservoir 26 from the brake pipe 22 through the usual branch pipe 28 and cut out cock 29.

At 31 I show a signal pipe line which extends from the locomotive under all cars of the train and which is supplied with air under pressure from the main reservoir 10 through a pipe 32 and reducing valve 33, the pressure being maintained at around 40 pounds per square inch. At 34 I show a cut out cock which in the position indicated in the drawing permits air to flow from the reducing valve 33 into the signal pipe line 31. When the handle of the valve is moved downwardly as indicated by the arrow in the drawing pressure is cut off to the signal pipe line and it is open to the atmosphere so that all the pressure in the signal pipe line can escape. Between the locomotive and the first car in the train and between each of the cars of the train are provided air hose 36 and couplings 37 for the air hose of the signal pipe line which couplings are made of a different size from the couplings 21 so as to prevent the signal pipe line from being coupled to the brake pipe and the brake pipe being coupled to the signal pipe line. Preferably, no angle cocks are provided in the signal pipe line but instead a dummy coupling 38 is provided at each end of the locomotive and each end of each car which, when coupled to its associated air hose 36 prevents the escape of air from the signal pipe line. Also connected to the signal pipe line 31 is a branch pipe 39 in which is mounted a well-known type of air signal diaphragm valve 41 with a warning whistle 42 which operates in the manner well understood upon variations of pressure in the signal pipe line 31.

Mounted in a suitable location on each of the cars of the train whereby the pipe connections about to be described may be conveniently made is my double piston valve 44. The valve 44 comprises an elongated cylinder 45, shown in Fig. 2, having a piston 46 mounted therein with its stem 47 surrounded by a spring 48 which bears against the piston and the adjacent head and biases the piston inwardly of the cylinder. A valve member 49 is provided on the end of the stem 47 and seats against a seat 51 provided in the head 52 of the cylinder. Ports 53 in the head 52 provide communication with the atmosphere for the space between the piston 46 and the head. Mounted in the other end of the cylinder 45 is a second floating piston 54 having a stem 56 which extends inwardly into close proximity to the piston 46 whereby, when the piston 54 moves inwardly the stem 56 engages the piston 46 and forces it outwardly to seat the valve member 49.

The end of the cylinder 45 adjacent the head 54 is connected by a conduit 58 to the air signal line so that the space between the piston 54 and the head of the cylinder is always provided with whatever pressure is in the signal pipe line. The other end of the cylinder 45 is connected by a conduit 57 to the brake pipe 22. The space between the pistons 54 and 46 in the cylinder 45 is in communication at all times with the brake cylinder 27 through a conduit 59.

When a train is made up, all the air hose between the cars in the brake pipe 22 and in the signal pipe line 31 are coupled; the angle cocks at the ends of the train are closed; and the dummy couplings 38 at the ends of the train are coupled to their associated hose whereby to prevent the escape of air from the signal pipe line. Air is then admitted to the brake pipe 22 and to the signal pipe line 31 in the usual manner. The air pressure in the signal pipe line 31 passing into the end of cylinder 45 through pipe connection 58 forces the piston 54 inwardly and its stem 56, engaging the piston 46 forces it outwardly with the valve 49 onto its seat 51, thereby preventing the escape of air from the brake pipe. As is well understood, before any train leaves a railroad terminal, trained inspectors see that the air hose are all coupled and that the brakes are in operating condition.

At 61 I indicate a brake beam which it will be understood is mounted upon and supported by the truck of a car in the usual manner. Also, as is well understood, brake beams, due to accident, often drop out of place and when falling under the wheels of a car may cause serious wrecks and damage to the train. In order to obviate this danger I connect the auxiliary reservoir 26 on each car with the signal pipe line 31 through a conduit 62 and interpose in the conduit a normally closed valve 63. The handle 64 of the valve 63 is connected through a flexible member 66, in any suitable manner, with the brake beam 61. Should the brake beam 61 drop out of place, the handle 64 would be moved downwardly and the passage 67 in the valve 63 would permit air to flow from the auxiliary reservoir 26 into the lower pressure signal pipe line 31. This sudden increase in pressure in the signal pipe line 31 would cause the air whistle 42 to sound, in a manner well understood, and thus warn the locomotive engineer that a brake beam had fallen. He could then apply the brakes on the train by manipulation of the engineer's brake valve 16, in the usual way. Withdrawing air from the auxiliary reservoir 26 would prevent the brake on the car with the fallen brake beam from being set.

In the normal operation of the train, the signal pipe line pressure on the piston 54 forces it to its innermost position in cylinder 45 forcing the valve member 49 onto its seat 51. Should an angle cock 23 be closed between the cars anywhere in the train thus cutting off the supply of air to the cars in the rear of the closed angle cock, the engineer upon becoming aware of the situation could still apply his brakes throughout the train by moving the valve 34 to a position to connect the signal pipe line 31 directly to the atmosphere thus allowing the air in the signal pipe line to escape. Upon release of pressure acting against the pistons 54, the springs 48 surrounding the stems 47 of the pistons 46 would move the pistons 46 inwardly thus moving the valve members 49 off their seats 51 throughout the train thus connecting the brake pipe 22 to the atmosphere. The reduction in brake pipe pressure thus ensuing would bring about a setting of the brakes on all the cars in the train.

Another important advantage of my invention is that it provides means whereby when cars of a train equipped with my invention are set out temporarily at sidings between terminals for switching the train, the brakes will remain set and will not leak off. This is brought about by reason of the fact that when the cars are set out the angle cocks at each end of the cut of cars are closed and the brakes set. Should a brake start to leak off, the pressure in the brake cylinder 27 goes down thus reducing the pressure between the pistons 54 and 46 in the cylinder 45. The spring around the stem 47 then forces the piston 46 inwardly allowing more air to escape to the atmosphere past the valve member 49 and the seat 51. Lowering the pressure in the brake pipe 22 causes the triple valve 24 on the car to operate, admitting air from the auxiliary reservoir 26 to the brake cylinder 27 to reapply the brakes. When the locomotive, together with whatever cars it may have coupled to it, is recoupled to the train, if all the air hose are not properly coupled and the angle cock opened, between the locomotive and the cars thus coupled, the engineer can not release the brakes. Also, it will be seen that should the engineer fail to set his brakes before uncoupling from a part of his train, the uncoupling of the signal pipe hose 31 between the cars to be uncoupled lowers the pressure outwardly of the piston 54 thus bringing about the opening of the valve member 49 to reduce brake pipe pressure thereby setting the brakes on the entire train.

While I have shown the air whistle signal 42 as being located on the locomotive, it will be apparent that it may be located in any suitable place on the train, or in a plurality of places, such as on the locomotive and on the rear of the train.

From the foregoing it will be apparent that I have devised an improved safety device for use in connection with the air brake system on a railway train which is simple of construction, economical of manufacture and which is reliable in operation.

While I have shown my invention in but one form, it will be obvious to those skilled in the art that it is not so limited, but is susceptible of various changes and modifications without departing from the spirit thereof, and I desire, therefore, that only such limitations shall be placed thereupon as are specifically set forth in the appended claims.

What I claim is:

1. In an airbrake system for a railway train including a vehicle and a locomotive, the combination with a brake pipe, a triple valve, an auxiliary reservoir and a brake cylinder, of a signal pipe line extending from the locomotive to the vehicle, means to supply air under pressure to the brake pipe, means to supply air under a lesser pressure to the signal pipe line, a valve on the vehicle with pipe connections to the brake pipe, the signal pipe line and the brake cylinder, said valve when open being disposed to vent brake pipe pressure to the atmosphere and set the brake, means operable responsive to pressure in the signal pipe line to hold the valve on its seat, other means operable responsive to brake cylinder pressure to hold the valve on its seat, and spring means operable to open the valve when there is little or no pressure in both the signal pipe line and the brake cylinder.

2. In an air brake system for a railway train including a vehicle and a locomotive, the combination with a brake pipe, a triple valve, an auxiliary reservoir and a brake cylinder, of a signal pipe line mounted on the vehicle and the locomotive alongside the brake pipe, means to supply air under pressure to the brake pipe, means to supply air under a lesser pressure to the signal pipe line, valve means mounted between the brake pipe and the signal pipe line comprising a cylinder, a pipe connection between the brake pipe and one end of the cylinder, a pipe connection between the signal pipe line and the other end of the cylinder, a valve in the end of the cylinder connected to the brake pipe which when open vents brake pipe pressure to the atmosphere, a piston in the cylinder for operating the valve, a second piston in the other end of the cylinder acted upon by the signal pipe line pressure and having a stem adapted to bear against the first mentioned piston, and a pipe connection between the brake cylinder and the second mentioned cylinder intermediate the two pistons.

3. In an airbrake system for a railway train including a vehicle and a locomotive, the combination with a brake pipe, a triple valve, an auxiliary reservoir and a brake cylinder, of a signal pipe line mounted on the vehicle and the locomotive alongside the brake pipe, means to supply air under pressure to the brake pipe, means to supply air under a lesser pressure to the signal pipe line, valve means mounted between the brake pipe and the signal line comprising a cylinder, a pipe connection between the brake pipe and one end of the cylinder, a pipe connection between the signal pipe line and the other end of the cylinder, a valve in the end of the cylinder connected to the brake pipe which when open vents brake pipe pressure to the atmosphere, a piston in the cylinder for operating the valve, a second piston in the other end of the cylinder acted upon by the signal pipe line pressure and having a stem adapted to bear against the first mentioned piston, a pipe connection between the brake cylinder and the second mentioned cylinder intermediate the two pistons, an angle cock on the vehicle operable to close off the supply of air to the brake pipe, and a valve on the locomotive operable to vent air from the signal pipe line to the atmosphere.

References Cited in the file of this patent

UNITED STATES PATENTS

| | | |
|---|---|---|
| 1,385,160 | Stokes | July 19, 1921 |
| 1,403,839 | Bristol | Jan. 17, 1922 |
| 1,648,215 | Bickel | Nov. 8, 1927 |
| 2,573,442 | Hines | Oct. 30, 1951 |